United States Patent
Filipi-Martin et al.

(10) Patent No.: US 7,082,536 B2
(45) Date of Patent: Jul. 25, 2006

(54) SYSTEM AND METHOD FOR COMPUTERIZED GLOBAL MESSAGING ENCRYPTION

(75) Inventors: Adrian Filipi-Martin, Charlottesville, VA (US); Jeff King, Charlottesville, VA (US)

(73) Assignee: GlobalCerts, LC, Leominster, MA (US)

( * ) Notice: Subject to any disclaimer, the term of this patent is extended or adjusted under 35 U.S.C. 154(b) by 752 days.

(21) Appl. No.: 09/993,724

(22) Filed: Nov. 14, 2001

(65) Prior Publication Data

US 2002/0112168 A1    Aug. 15, 2002

(51) Int. Cl.
H04L 9/00    (2006.01)

(52) U.S. Cl. .............. 713/171; 713/150; 713/180; 380/30; 380/164; 380/281; 380/282; 709/204; 709/206; 709/217

(58) Field of Classification Search .......... 713/171, 713/150, 180, 200; 380/30, 282, 264, 281; 709/217, 206, 204
See application file for complete search history.

(56) References Cited

U.S. PATENT DOCUMENTS

| | | | |
|---|---|---|---|
| 5,410,602 A * | 4/1995 | Finkelstein et al. | 380/281 |
| 5,509,071 A | 4/1996 | Petrie, Jr. | 380/4 |
| 5,552,897 A * | 9/1996 | Mandelbaum et al. | 358/400 |
| 5,748,735 A | 5/1998 | Ganesan | 380/21 |
| 5,812,671 A | 9/1998 | Ross, Jr. | 380/49 |
| 5,870,475 A | 2/1999 | Allan et al. | 380/21 |
| 6,009,173 A | 12/1999 | Sumner | 380/21 |
| 6,011,448 A | 1/2000 | McCabe et al. | 332/117 |
| 6,038,322 A | 3/2000 | Harkins | 380/279 |
| 6,215,878 B1 | 4/2001 | Harkins | 380/281 |
| 6,442,600 B1 * | 8/2002 | Anderson | 709/217 |
| 6,625,734 B1 * | 9/2003 | Marvit et al. | 713/201 |
| 6,721,784 B1 * | 4/2004 | Leonard et al. | 709/206 |
| 6,807,277 B1 * | 10/2004 | Doonan et al. | 380/281 |
| 6,847,719 B1 * | 1/2005 | Ballard | 380/279 |
| 6,851,049 B1 * | 2/2005 | Price, III | 713/150 |
| 2004/0139314 A1 * | 7/2004 | Cook et al. | 713/151 |

* cited by examiner

Primary Examiner—Ayaz Sheikh
Assistant Examiner—Shin-Hon Chen
(74) Attorney, Agent, or Firm—Douglas W. Kim; McNair Law Firm, P.A.

(57) ABSTRACT

A computer based message encryption system for transmitting encrypted message between a sending member of an internal messaging system and a receiving non-member or receiving member external user without requiring the sender or recipient member to maintain and support encryption key pairs themselves. An internal system that contains an external server for creating key pairs for message encryption between the senders and receives for the encryption of messages. The key pairs are encrypted themselves according to an encryption pass-phrase so that the pass-phrase may used to decrypt the key pair which in turn may be used to decrypt the message. In response to a predetermined time or destroy command, said encryption key pairs are destroyed.

33 Claims, 7 Drawing Sheets

SYSTEM AND METHOD FOR COMPUTERIZED GLOBAL MESSAGING ENCRYPTION

FIELD OF THE INVENTION

The present invention relates generally to the field of secure information transmissions and, more particularly, to the encryption of electronic messages between internal members of an encryption system and external non-members, especially for electronic messages transmitted on the Internet.

BACKGROUND OF THE INVENTION

Given the rapid expansion of the Internet, the reliance upon electronic messaging, the widespread transmission of data and the ongoing concerns of privacy and security, cryptography is an area to which considerable attention must be directed. The problem exists in three areas, first, between members of a local message system having an encryption system; second, between members and non-members of the encryption system; and, third, between two non-members.

One method of sending secured messages for these three cases is the use of session keys that apply to a single information exchange session. Another method is by using public and private keys to encrypt and decrypt messages. The term encryption key pair is used to include session keys, public and private keys, and can both can be encrypted and unencrypted themselves. Both methods use an encryption key and decryption key for electronic messages. In this second system, two keys are mathematically linked; the public key is distributed to other users and used to encrypt messages back to the sender, and the private key is kept secret and used to decrypt a message encrypted with the public key. There are disadvantages with both methods. For example, while single session keys, having an encryption and decryption key, may be very secure, these keys are difficult to distribute and maintain especially when multiple parties need to communicate securely with one another. Therefore, it is problematic, to say the least, to maintain a single session encryption key pair system when the users could include all the users of the Internet. This is especially true when the number of potential Internet users is expected to reach 490 million by the year 2002.

Existing public/private key systems require that each user have a public and private key such as the widely used PGP system. This requires that each individual have a public key or encryption key distributed to other users while the individual keeps a private key or decryption key secret for the decryption of the messages. These traditional systems require that each user of a public/private key system maintain a set of keys, have software for utilizing the keys, and have each message encrypted and decrypted with the keys and software. Again, considerable setup and maintenance is required by the senders and recipients to use this type of system. The automation of such traditional systems can simply these tasks.

This task is somewhat simplified when limited to local users of a central message system. An internal server can automatically manage the associated keys as well as automate much of the encryption and decryption process. Additionally, the subscribers to a secure message service can have significantly more of this process automated, thereby reducing the complexity and difficulty for the local user or subscriber. In fact, the encryption and decryption can become transparent. The task is complicated when it is necessary to send messages beyond the local system or subscribers to third parties. For example, a local user or member may wish to send an encrypted message over the Internet to an email account maintained by an ISP or other source, such as a Hotmail, AOL, or Yahoo! account. While members of the local encryption system can have the benefit of managed keys, other users or non-members do not have this benefit. The members of an encryption system need a simple but secure system to send encrypted messages to a non-member user. Further, existing secure message management systems have often required difficult installations having processes that are difficult to use by the widespread user community of the Internet and other networks.

Therefore, there is a need in this area to provide for a secure messaging system which does not require individuals to maintain permanent keys nor is restricted to a particular network in order to receive and decrypt encrypted messages. Further, there is a need for a secure message system that enables the user to send and receive messages without requiring complicated setup by the user.

SUMMARY OF THE INVENTION

The present invention overcomes these and other problems of the prior art by providing a computerized message encryption system and method for transmitting encrypted messages between an internal user or member of an internal system to an external or non-member recipient in response to a request to a processing unit of a computer. The system, in one embodiment, comprises a set of computer readable instructions embodied in a computer readable medium that when read by the processing unit causes the processing unit to create an encryption key pair, store the key pair in the computer readable medium, encrypt the message with the key pair, and transmit a message notice to the recipient. The key pair can be stored in encrypted form as well. Further, the system of the present invention can include computer readable instructions for associating an encryption pass-phrase with the encryption key pair so that a proper pass-phrase is required for decryption of the key pair to subsequently decrypt the message. Further, the system can include instructions for receiving a view message request from the recipient, receiving a decryption pass-phrase associated with the view message request from the recipient, decrypting the message with the decryption pass-phrase and encryption key pair, and providing the decrypted message available to the recipient.

The key pair can be destroyed after a prescribed period of time as well as by a destroy command received from the recipient. Therefore, the present invention provides for a secure message system, methods, and means of communication between members and non-members of an encryption system.

Another benefit of this invention is to allow a non-member to send an encrypted reply to the originating member.

Yet another benefit is to allow the original sender to establish an expiration period for the outgoing message to destroy the key pair after a period of time so that the decryption of the message with the key pair is not subsequently possible.

These benefits are accomplished by providing for a computerized system, method, and means for encrypting an electronic message between a sender and a recipient regardless of whether the sender or recipient are members of an encryption system comprising a computer processor in communication with a computer readable medium, a communications link in communication with the computer readable medium for communications with a sender terminal and a recipient terminal, and, a set of non-member instructions contained within the computer readable medium for, when processed by the computer processor and in response to a member (sender) sending an electronic message to a non-member (recipient) from the sender terminal, prompting the member for an encryption pass-phrase at the sender terminal, receiving an encryption pass-phrase from the member at the sender terminal, creating an encryption key pair, encrypting the electronic message responsive to key pair, encrypting the key pair, sending a notification to the recipient terminal that an encrypted message is available to the non-member, prompting the non-member for a decryption pass-phrase corresponding to the encryption message at the recipient terminal, receiving the decryption pass-phrase from the non-member, decrypting the encryption key pairs in response to receiving a decryption pass-phrase corresponding to the pass-phrase associated with the encrypted message, and, decrypting the message with the decrypted key pairs so that the decrypted message is available for review by the non-member.

Additionally, a member database can be contained within the computer readable medium, have a member record associated with each of the members of the encryption system. A set of member location instructions can be contained within the computer readable medium for querying the member database to determine whether the recipient has an associated record within the member database and executing the non-member instructions if no associated record is found. The non-member instructions can include instructions for prompting the member at the sender terminal for a message lifetime value, associating the message lifetime value with the encrypted message sent by the member, and, deletion instructions, contained within the computer readable medium for deleting the encrypted message or encryption key pair upon expiration of the lifetime value associated with the electronic message so that upon expiration of the lifetime value, the electronic message cannot be decrypted and is unavailable.

A message database can be included within the computer readable medium having a message record associated with the electronic message, and the non-member instructions can include instructions creating a message ID associated with the electronic message to be sent to the non-member, storing the message ID within the message record associated with the electronic message, creating an encryption key pair associated with the electronic message, encrypting the encryption key pair, storing the encrypted key pair within the message record associated with the electronic message according to the encryption key pair so that the encryption key pair is used to decrypt the electronic message. A set of stale message instructions contained within the computer readable medium for deleting the encryption key pair upon the expiration of a predetermined period of time can also be provided. These stale message instructions can include instructions for removing the message record from the message database as well.

The non-member instructions can also include instructions for prompting the non-member for a decrypting pass-phrase to be used to decrypt the message or encryption key pair, receiving the decrypting pass-phrase from the non-member, retrieving the message record from the message database according to the message ID, retrieving the associated key pair from the message record, and, decrypting the electronic message according to the key pair and decryption pass-phrase. Additionally, the non-member instructions can include instructions for creating a key pair responsive to having a message to be encrypted, encrypting the message with the key pair, encrypting the key pair with the pass-phrase, and, deleting the pass-phrase.

Deletion instructions can be contained within the computer readable medium to delete the encryption key pair upon receiving a delete request from the non-member so that the non-member can expressly request for the encrypted message to be made unavailable for review.

A member database contained within the computer readable medium can have a member record associated with each of the members of the encryption system, a unique encryption key contained within the member record associated with each of the members of the encryption system, a set of reply instructions contained with the computer readable medium for, in response to receiving a reply command from the non-member through the recipient terminal, receiving a reply message from the non-member intended for the sending member, retrieving the unique encryption key associated with the sending member from the member database, encrypting the reply message according to the unique public key of the sending member, and, informing the sending member that an encrypted reply message from the non-member is available for decrypting and review by the member so that a non-member can send an encrypted reply to a member of an encryption system without having to be a member of that encryption system.

The member database contained within the computer readable medium can also have a member record associated with each of the members of the encryption system, a unique public key contained within the member record associated with each of the members of the encryption system, a unique public key contained within the member record associated with each of the members of the encryption system, and a set of member instructions contained within the computer readable medium for, in response to a first member sending an electronic message to a second member, retrieving a second member's public key from the members database, encrypting the electronic message responsive to the second member's public key, and, sending a notification to the second member notifying the second member that an encrypted message is available for decryption so that an electronic message is encrypted automatically and the receiving member is notified automatically when an encrypted message is available for decryption and review. The member instructions can include instructions for, in response to the second member requesting to decrypt the encrypted message, retrieving a second member's private key from the member database, decrypting the encrypted electronic message from the first member according to the second member's private key, and providing the decrypted electronic message to the second member for review so that an electronic message can be encrypted, sent from a first member to a second member and decrypted automatically.

DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

The detailed description that follows may be presented in terms of program procedures executed on a computer or network of computers. These procedural descriptions are representations used by those skilled in the art to most effectively convey the substance of their work to others skilled in the art. These procedures herein described are generally a self-consistent sequence of steps leading to a desired result. These steps require physical manipulations of physical quantities such as electrical or magnetic signals capable of being stored, transferred, combined, compared, or otherwise manipulated. An object or module is a section of computer readable code embodied in a computer readable medium that is designed to perform a specific task or tasks. Actual computer or executable code or computer readable code may not be contained within one file or one storage medium but may span several computers or storage mediums. The terms "host," "server," "client," or "computer" may be hardware, software, or a combination of hardware and software that provides the functionality described herein.

The present invention is described below with reference to flowchart illustrations of methods, apparatus, ("systems") and computer program products according to the invention. It will be understood that each block of a flowchart illustration or diagram component can be implemented by a set of computer readable instructions or code. These computer readable instructions may be loaded onto a general purpose computer, special purpose computer, or other programmable data processing apparatus to produce a machine such that the instructions will execute on a computer or other data processing apparatus to create a means for implementing the functions specified in the flowchart block or blocks.

These computer readable instructions may also be stored in a computer readable medium that can direct a computer or other programmable data processing apparatus to function in a particular manner, such that the instructions stored in a computer readable medium produce an article of manufacture including instruction means that implement the functions specified in the flowchart block or blocks. Computer program instructions may also be loaded onto a computer or other programmable apparatus to produce a computer executed process such that the instructions are executed on the computer or other programmable apparatus provide steps for implementing the functions specified in the flowchart block or blocks. Accordingly, elements of the flowchart support combinations of means for performing the special functions, combination of steps for performing the specified functions and program instruction means for performing the specified functions. It will be understood that each block of the flowchart illustrations can be implemented by special purpose hardware based computer systems that perform the specified functions, or steps, or combinations of special purpose hardware or computer instructions. The present invention is now described more fully herein with reference to the drawings in which the preferred embodiment of the invention is shown. This invention may be embodied in many different forms and should not be construed as limited to the embodiment set forth herein. Rather, these embodiments are provided so that this disclosure will be thorough and complete and will fully convey the scope of the invention to those skilled in the art.

It is well understood by those of skilled in the art that the computer network can be provided in various configurations. Further while the instructions relating to the encryption key pairs, password and durational message instructions are described as being processed and stored by a single server, it is understood that multiple servers or other devices can be utilized to process and store the instructions. Further, while the system is described with relation to computer instructions in computer readable medium, it is well understood that other technologies such as firmware, flashed chips, EEPROM, or other similar technology, can be utilized to transmit, store and process such instructions. For example, in other configurations handhelds, wireless phones, PDA's and portables can be utilized to transmit, receive and process such instructions associated with messages. This is equally applicable to the description of the logic flow that follows.

Figure 1:
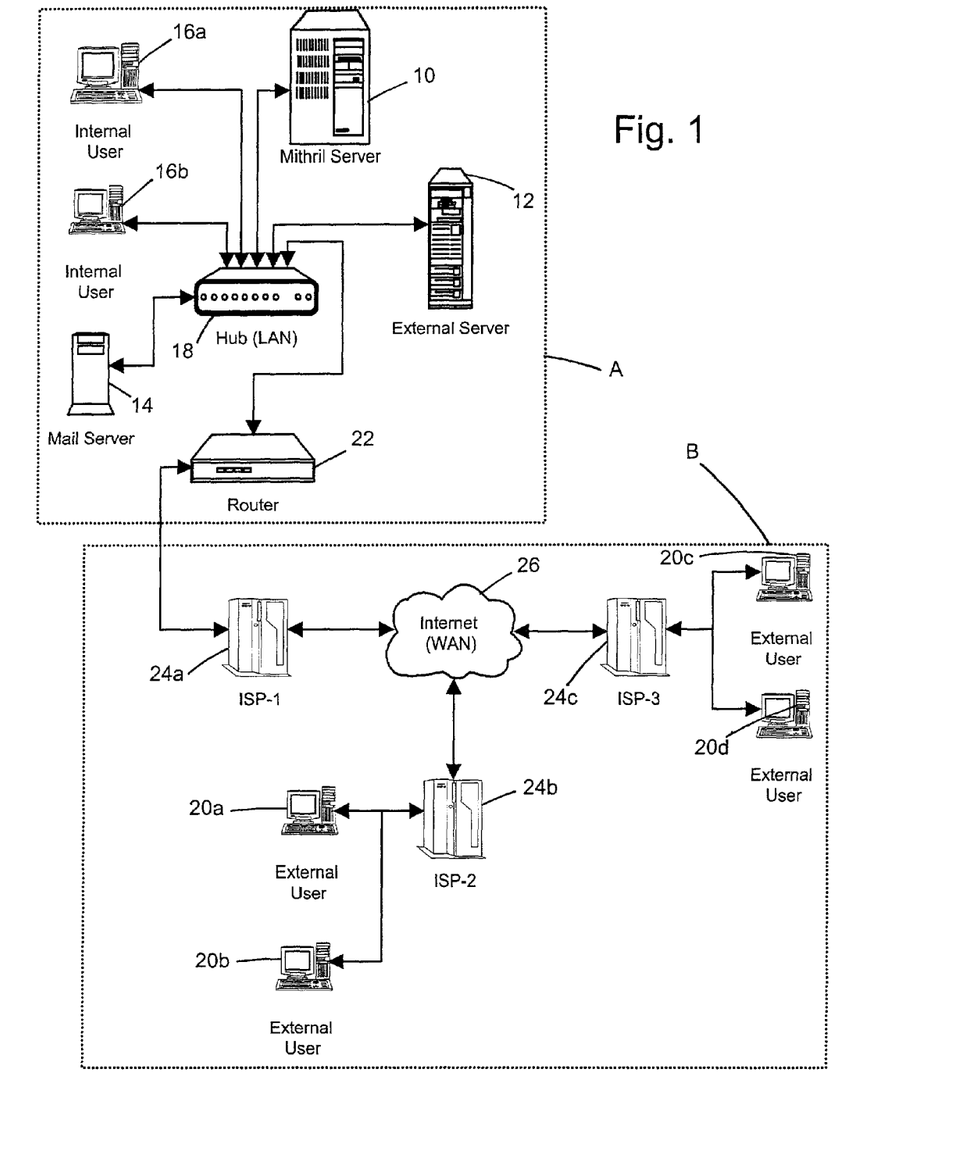
FIG. 1 is a schematic of a computerized system and method for global messaging encryption according to the present invention.

Referring now to FIG. 1, a diagram is illustrated showing an internal network employing an internal server 10, external server 12, and mail server 14. Internal server 10 constitutes hardware and software for primarily providing a key pair messaging encryption system for internal users or members 16a and 16b. It should be noted that the software of the internal server and the encryption messaging system may, but need not, reside on physically separate hardware from the external server 12 and mail server 14. In the event the software does reside on physically separate hardware, the communication link between internal users 16a and 16b and the server 14 are connected through network hub 18. This allows electronic messages to be transmitted from member 16a to internal server 10 for encryption with member 16b public key 30a so that member 16b can decrypt the message with the private or decryption key 30b when received from user 16a. Internal server 10 maintains the public and private key information for each member in order to make encryption transparent to that particular member. Therefore, encrypted communications are automatically encrypted without the member having to specifically manage the key pair. Internal network A can also be connected to an external network B so members can transmit messages to and from external users or non-members 20a through 20d. For example, a member to the encryption system can send an encrypted message to non-member 20a through 20d. This allows encrypted messages to travel between the member and anyone on the Internet. Internal network A is connected to router 22 and through ISP 24a to Internet 26. ISP 24b and 24c are also connected to Internet 26 so that communication is possible between members and non-members, internally or externally.

Figure 2:
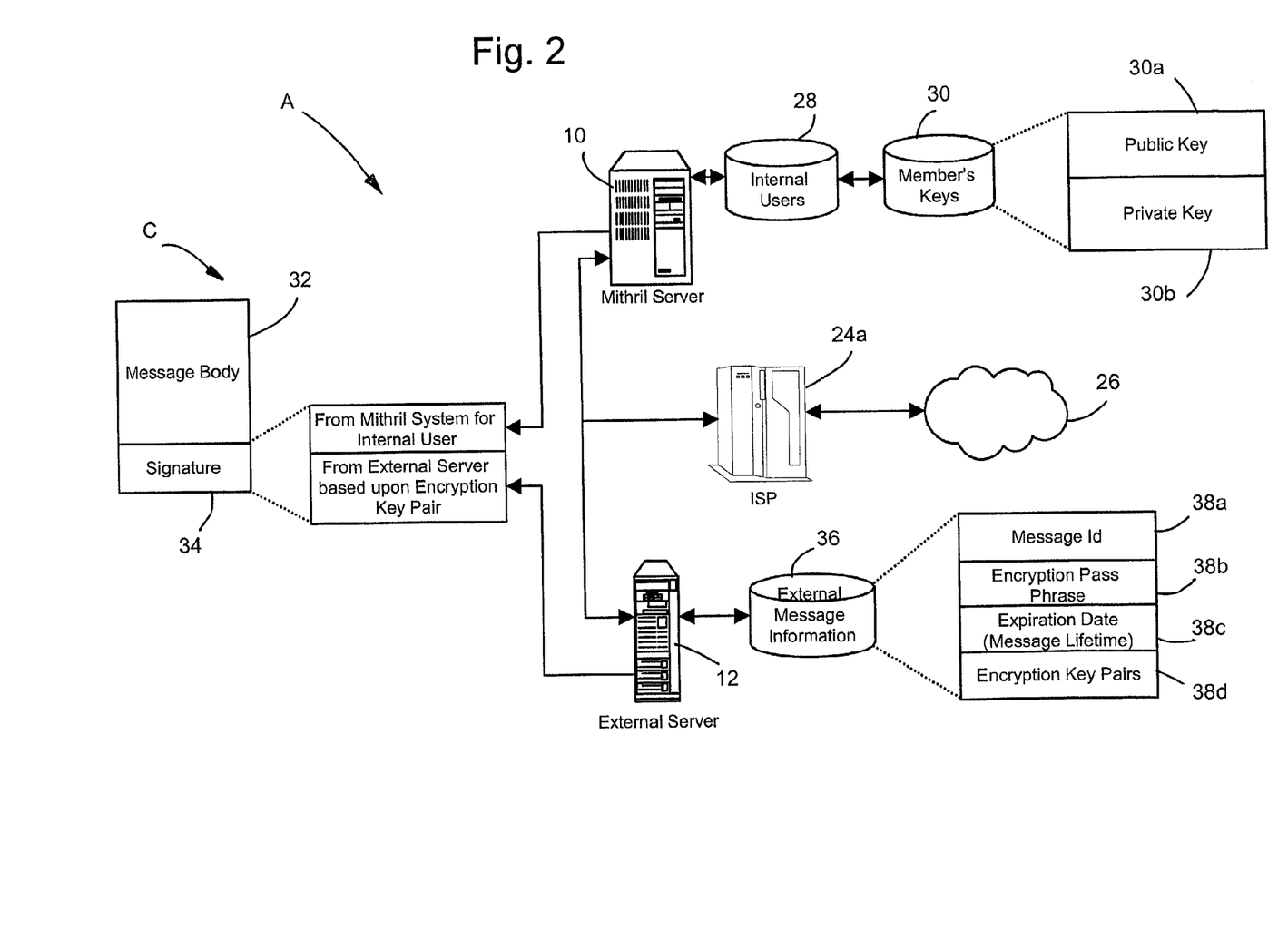
FIG. 2 is a schematic of data flow and components of the invention.

Referring now to FIG. 2, internal network A is shown in more detail. When a member transmits the message, shown generally as C, the message is initially transmitted to internal server 10. The internal server maintains a member database 28 with a record for each member comprising a row or alternatively another designated portion of the database. Associated with the members are a public and private key pair 30 that contains public key 30a and private key 30b for each member. The internal server software then determines if the recipient of the message is a member or not of the encryption system. If the recipient is a member, the internal server accesses the public and private key of the recipient from the information in database 28 and 30 and encrypts message 32 with signature 34 based on the information discovered by the internal server. The message is then routed to the recipient so that the recipient may decrypt and read the message based on the recipient's private or decryption key.

If the server cannot discover the message's intended recipient or recipients as a member, message 32 is then sent to external server 12 since the recipient is not a member of the encryption system. External server 12 then writes a record to external message information database 36 which contains fields for such information as the message ID 38*a*, an expiration date, if desired, for the message 38*c* entered by the sender, and, the encryption key pairs 38*d* created by the external server for encryption and decryption. The message is then encrypted by the external server based on the encryption key pairs. At this point, the message can be sent to ISP 24*a* and out to the wide area network or Internet 26 informing the recipient that a message has been sent to them.

In one embodiment, when the encryption key pairs are created by the external server, they are used to encrypt the message. The encrypting pass-phrase received by the sender can be used to encrypt the encryption key pairs themselves. Then, the pass-phrase is discarded or deleted. Therefore, the key pairs can only be decrypted with the pass-phase use for encryption. When the recipient presents the decryption pass-phrase, this pass-phrase is used to decrypt the encryption key pair and if the results is a valid key pair, than the proper decryption pass-phrase was presented and the key pair is available to decrypt the message. By only storing an encrypted encryption key pair and specifically not storing unencrypted encryption key pair or encryption pass-phrase, no person authorized or otherwise can access the system and view the message without a proper decryption pass-phrase.

Figure 3A:
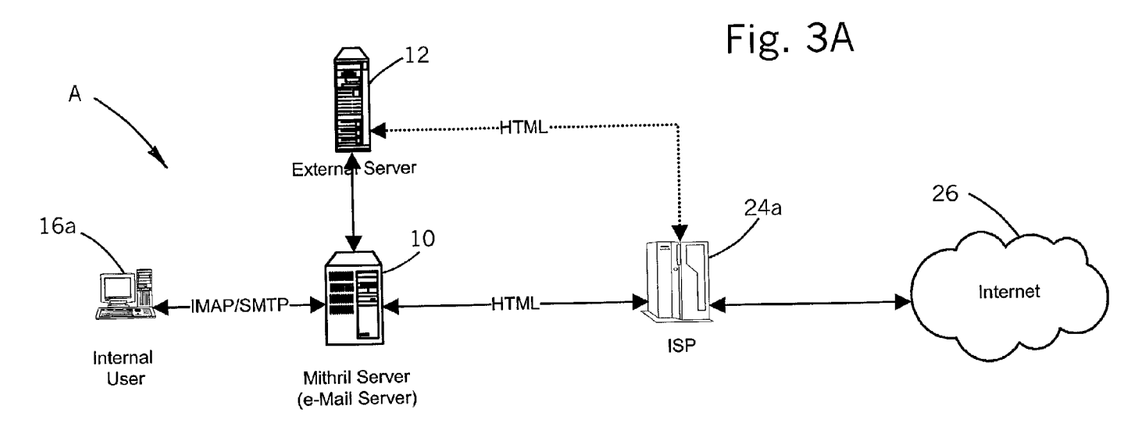
FIGS. 3A and 3B are schematics showing the various configurations of the invention.

The communications between the internal system A and the Internet is further illustrated in FIG. 3A. In this illustration, the internal server and normal message server are physically contained within the same hardware while the external server software is physically separate. Member 16*a* communicates with the combination internal server and message server through IMAP and SMTP. IMAP stands for Internet Message Access Protocol and is a protocol for receiving messages while SMTP stands for Simple Mail Transfer Protocol and is used for sending messages between servers. Typically most Internet messages use SMTP to go from server to server and the messages are retrieved using either IMAP or Post Office Protocol. Post Office Protocol, or POP, is also used to retrieve messages from the mail server. For messages traveling outside of internal network A, both internal server mail server, and external server communicate with ISP 24*a* using SMTP protocol.

Figure 3B:
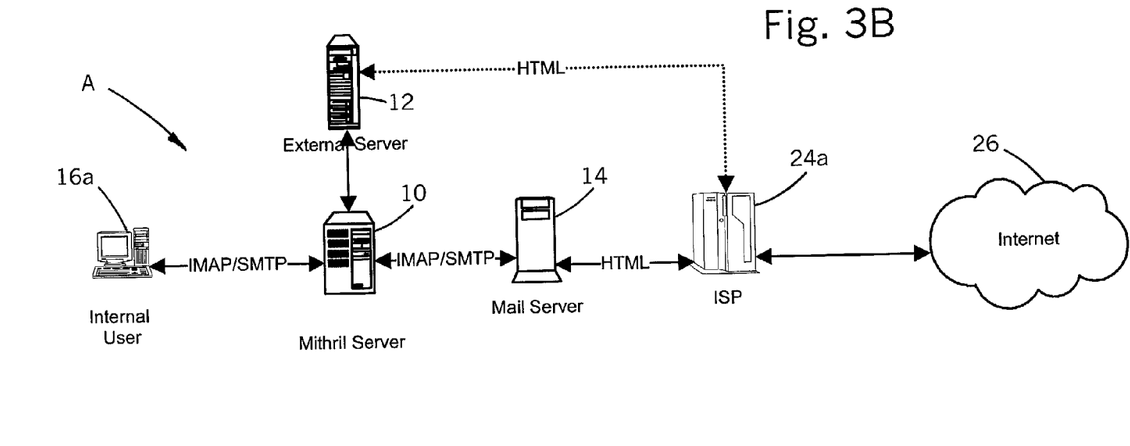

FIG. 3B shows internal network where internal server and the mail server are physically separated. In this configuration, the internal server communicates with the mail server through IMAP or SMTP and the mail server communicates with the ISP 24*a* using SMTP. The various protocols in communications will be discussed in further detail in the discussion showing the physical transmissions of the various messages through the system.

Figure 5:
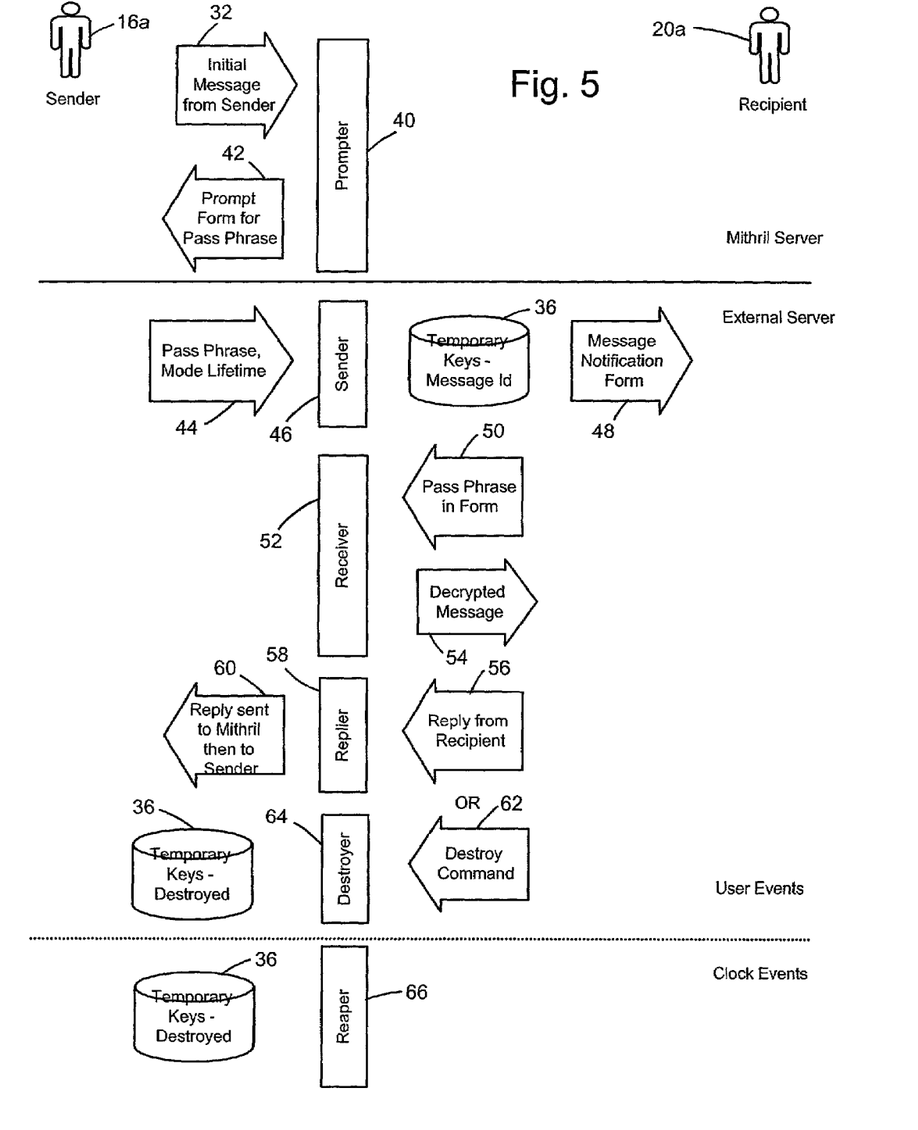
FIG. 5 is a schematic showing the message flow between a sender and recipient; and, FIG. 6 is a schematic of the encryption and decryption of a message.

Referring now to FIG. 5, the message flow is illustrated through the system. Member 16*a*, also referred to as the sender, initially wishes to send a message to a non-member 20*a*, also referred to as the recipient. The initial message 32 is created by the sender and is received by a set of computer readable instructions named the prompter 40 which is software residing on the internal server 12 (not shown). When message 32 is received by prompter 40, internal server determines that the recipient is not contained within member database 28 and creates form 42 which is transmitted to sender 16*a*. Form 42 prompts for an encryption pass-phrase 38*b*, mode of delivery, and expiration date for the message. The completed form 44 is transmitted to a set of computer instructions named the sender 46, which resides on the external server. An encryption key pair 136 (FIG. 6) is created and used to encrypt the original message 32.

The key pair is then encrypted using the encryption pass-phrase and encrypted key pair 136 (FIG. 6) can be stored in database 36 for future access. The encryption pass-phrase can then be discarded.

Figure 6:
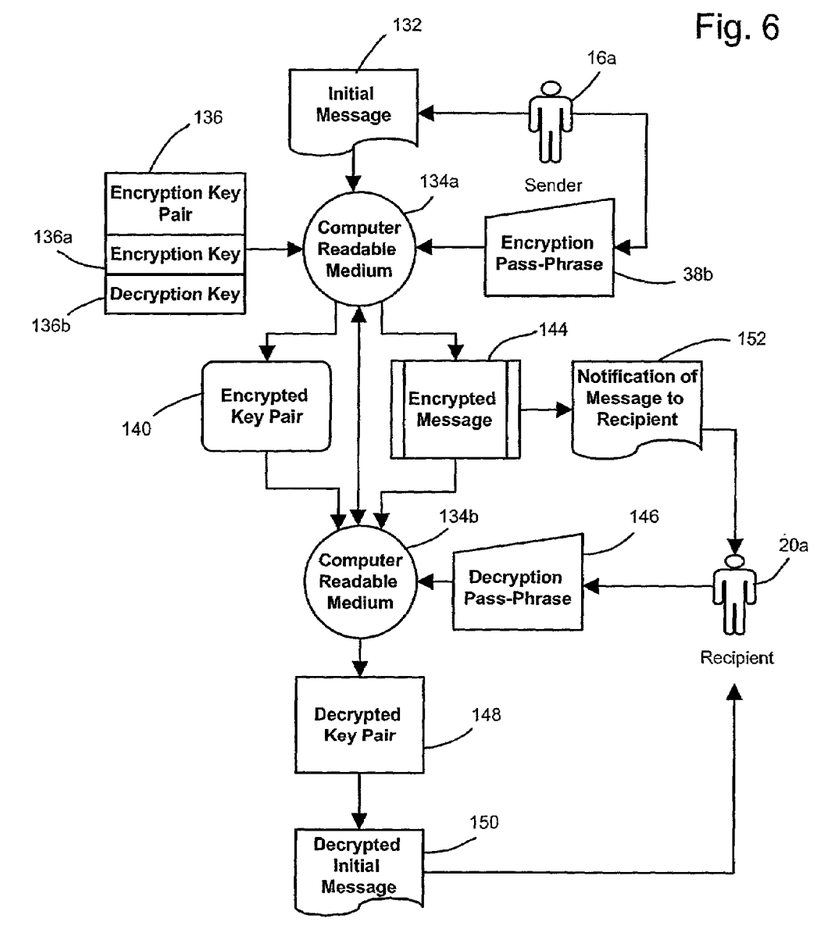

Message notification form 48 is transmitted to recipient 20*a* to inform the recipient that an encrypted message has been sent to the recipient from the sender and prompts the recipient for a decryption pass-phrase 146 (FIG. 6). Recipient 20*a* supplies the decryption pass-phrase in pass phrase form 50 which is transmitted to receiver 52. A set of computer instructions named the receiver, upon verification of the decryption pass-phrase, decrypts the message 54 and makes the message available to recipient 20*a*. At this point, recipient 20*a* can view the decrypted message from sender 16*a*. Next, the recipient may wish to send a reply message 56 back to the sender. If so, the reply message is received by computer readable instructions called the replier 58. The replier then encrypts reply 56 using the known encryption key of sender 16*a* retrieved from the internal server and sends the encrypted reply 60 to sender 16*a*. Alternatively, recipient 20*a* may send a destroy command 62 to the computer instructions named the destroyer 64 informing the external server to destroy the encryption key pair in database 36 or the message itself so that the original message 32 is unable to be decrypted. Additionally, the encryption key pair or the message can be deleted once the expiration date has passed by the computer instructions named the reaper 66. The system administrator is of the external server may set parameters so that messages which have not been opened within a specified period of time have the key pairs deleted, making the messages impossible to decrypt. Therefore, both the sender and the external server administrator can set the time for which a message can be decrypted.

Figure 4A:
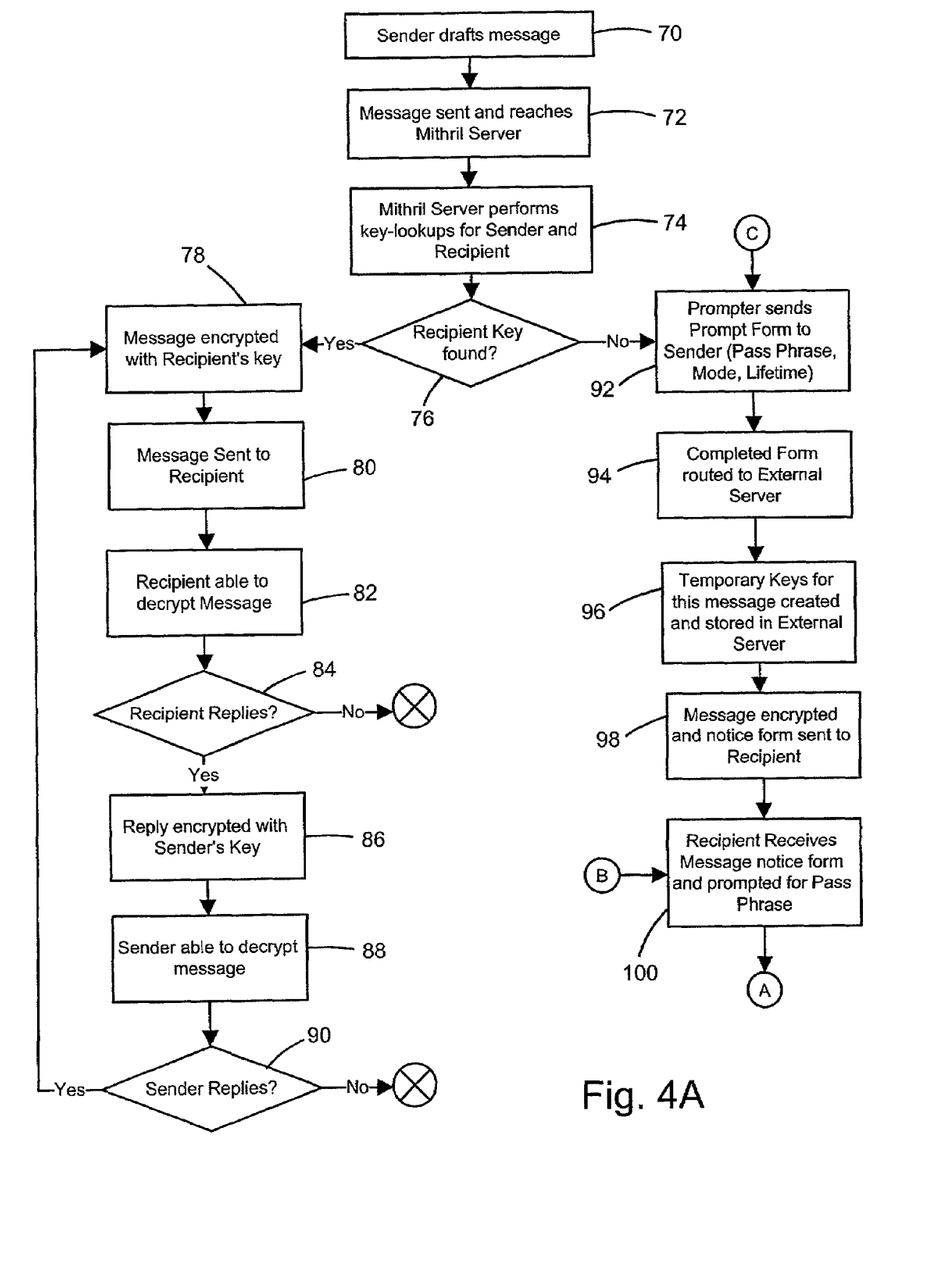
FIG. 4A is a flowchart showing the steps taken in sending and receiving the message.

Referring now to FIG. 4A, the logic flow of the system is illustrated in further detail. In step 70, sender drafts the initial message that is forwarded to the internal server in step 72. Internal server performs a query for the recipient in step 74 and an inquiry is made to whether the recipient is found in step 76. If the recipient is found in step 78, the message is encrypted with the recipients encryption key and transmitted to the recipient in step 80 where the message is available for decryption using the recipient's decryption key in step 82. Inquiries are made on whether the recipient replies in step 84 and, if not, the process ends. However, if the recipient replies, a reply is encrypted with the sender's encryption key in step 86 so that the reply is able to be decrypted with the sender's decryption key in step 88. Inquiries are made to whether the sender has replied to the reply in step 90 and, if not, this process ends. Otherwise, the process returns to step 76.

If the recipient was not found in the member database at step 76, then the prompter 40 sends a prompt form to the sender requesting a pass-phrase associated with the message, delivery mode, and message lifetime in step 92. The sender completes this form which is then routed to the external server in step 94 thereby providing the external server with the encryption pass-phrase 38*b* (FIG. 6), mode, and message lifetime information. Encryption key pair 136 (FIG. 6) for this message is created in step 96 and sent to the external server. The message is encrypted in step 98 with the key pair and a notice is sent to the recipient informing the recipient that an encrypted message has been sent from the sender. It is noted that it is advantageous to remove the encryption pass-phrase and the unencrypted key pair from the computer readable medium. Recipient receives the message notice and is prompted for a decryption pass-phrase in step 100. Such notifications can be provided, transmitted, and received utilizing various technologies and systems such as handhelds, wireless phones, PDA's and portables.

Figure 4B:
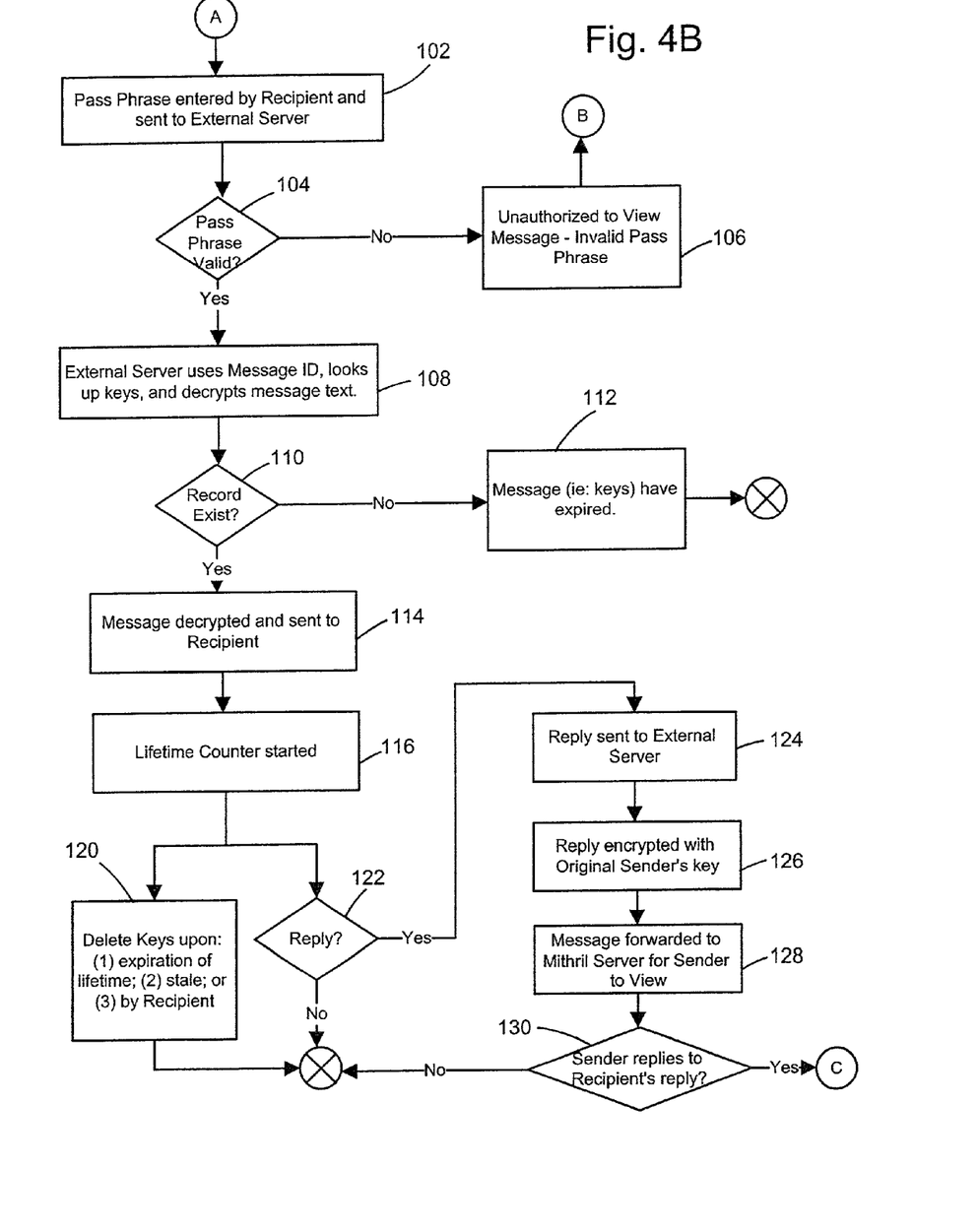
FIG. 4B is a continuation of the flowchart of FIG. 4.

Referring now to FIG. 4B, the decryption pass-phrase is entered by recipient in a form in step 102 and the entered information is sent to the external server. The decryption pass-phrase is checked for validity in step 104 and, if invalid, the recipient is notified that the entered decryption pass-phrase is invalid in step 106 and the process returns to step 100. If the decryption pass-phrase is valid, external server performs a key pair look-up based upon the message ID and retrieves the key pair to decrypt the key pair and subsequently the message in step 108. Alternatively, the key pair can be retrieved during the message ID look-up. If the message ID look-up of step 110 is unsuccessful, the key pair can be set to expire in step 112 and the process ends. If the key pair is not expired, the recipient is notified that the decryption pass-phrase is invalid or that the message is expired. Otherwise, if the key pair was discovered, the message is decrypted according to the key pair and pass decryption pass-phrase and sent to the recipient in step 114. When the message is opened, a lifetime counter for the message is started in step 116. At this point, the key pair will be deleted from the external server based upon the conditions in step 120 which can be responsive to the message lifetime, stale message condition, or a destroy message command by the recipient. Once the recipient receives the decrypted message, the recipient has the opportunity to reply in step 122, if recipient does not reply the process ends. However, if the recipient does reply, the reply is sent to the external server in step 124, encrypted with the original sender's encryption key in step 126, and the message is forwarded to the internal server for transmission to the sender to decrypt and view in step 128. If the sender decides to reply to the recipient's reply as illustrated in step 130 then the process begins again at step 92, otherwise, the process ends.

Referring now to FIG. 6, the process of encryption and decryption using the encryption key pair and pass-phrases will now be described in more detail. When sender 16a wishes to have an initial message 132 sent to recipient 20a, the initial message is contained within a computer readable medium 134a. In FIG. 6, 134a and 134b represent computer readable medium and are shown as separate components. However, 134a and 134b need not necessarily be separate and can be the same computer readable medium. Encryption key pair 136 is created having encryption key 136a and decryption key 136b. This encryption key pair is used to encrypt the initial message to provide and an encrypted message 144. The encryption key pair is then encrypted itself using an encryption pass-phrase 38b supplied by sender 16a providing for encrypted key pair 140. At this point, the encryption pass-phrase and the unencrypted encryption key pair can be deleted from the computer readable medium so that only encrypted message 144 and encrypted key pair 140 remain in computer readable medium 134a. Notification of encrypted messages 152 is provided to recipient 20a. At this point, recipient 20a supplies decryption pass-phrase 146 to computer readable medium 134b. The decryption pass-phrase may be used to decrypt the encrypted key pair into a decrypted key pair 148. Once decrypted, the decrypted key pair is used to decrypt the initial message to provide a decrypted initial message 150 which is supplied to recipient 20a.

While a preferred embodiment of the invention has been described using specific terms, such description is for illustrative purposes only, and it is to be understood that changes and variations may be made without departing from the spirit or scope of the following claims.

What is claimed is:

1. A computerized system for encrypting an electronic message between a sender and a recipient regardless of whether the sender or recipient are members of an encryption system comprising:
   a computer processor;
   a computer readable medium in communications with said computer processor;
   a communications link for communications between said computer readable medium, a sender's terminal and a recipients terminal;
   a set of non-member computer readable instructions contained within said computer readable medium, when processed by a computer processor and in response to a member sending an electronic message to a non-member recipient from said sender terminal:
   prompting the member for an encryption pass-phrase at said sender terminal,
   receiving an encryption pass-phrase from the member at said sender terminal,
   generating an encryption key pair stored within the computer readable medium not held the non-member recipient,
   encrypting the electronic message responsive to said encryption key pair so that said key pair may be used to decrypt said encrypted message,
   sending a notification to said recipient terminal that an encrypted message is available to the non-member recipient,
   encrypting said encryption key pair according to said encryption pass-phrase,
   prompting the non-member for a decryption pass-phrase corresponding to said encrypted message at said recipient,
   receiving said decryption pass-phrase from the non-member,
   decrypting said encrypted key pair in response to receiving a decryption pass-phrase corresponding to said encryption pass-phrase,
   decrypting said encrypted message according to said encryption key pair, and,
   providing the decrypted message for review to said non-member so that the non-member can receive and decrypt an electronic message from a member of an encryption system even though the non-member is not a member of the encryption system.

2. The system of claim 1 wherein said set of non-member instructions includes instructions for:
   removing said unencrypted key pair from said computer readable medium; and,
   removing said encryption pass-phrase from said computer readable medium so that only said encrypted encryption key pair is contained within said computer readable medium.

3. The system of claim 1 including:
   a member database contained within said computer readable medium having a member record associated with each of the members of the encryption system;

a set of member location instructions contained within said computer readable medium for:

querying said member database for determining whether the recipient has an associated record within said member database, and, executing said non-member instructions if no associated record is found for the recipient in said member database.

4. The system of claim 1 wherein said non-member encryption instructions includes instruction for:

prompting the member at said sender terminal for a message lifetime value;

associating said message lifetime value with the encrypted message send by the member; and, a set of lifetime deletion instructions contained within said computer readable medium for deleting said encrypted message upon expiration of said lifetime value associated with the electronic message so that upon expiration of said lifetime value the electronic message can not be decrypted and therefore is unavailable for review.

5. The system of claim 1 including:

a message database included within said computer readable medium having a message record associated with the electronic message; and, said non-member instructions including instructions for:

creating a message ID associated with said electronic message to be sent to the non-member, storing said message ID within said message record associated with the electronic message, and, storing said encrypted encryption key pair within said message record associated with the electronic message.

6. The system of claim 1 including a set of stale message instructions contained within said computer readable medium for deleting said encryption key pair associated with said encrypted message upon the expiration of a predetermined period of time so that if the encrypted message is not decrypted within said predetermined period of time, the encrypted message is unavailable for review.

7. The system of claim 1 wherein:

said non-member instructions include instruction for:

prompting the member at said sender terminal for a message lifetime value, associating said lifetime value with the encrypted message sent by the member, and, a set of lifetime deletion instructions contained within said computer readable medium for deleting said encryption key pair upon expiration of said lifetime value associated with the electronic message so that upon expiration of said lifetime value the electronic message can not be decrypted and therefore is unavailable for review.

8. The system of claim 1 including deletion instructions contained within said computer readable medium for deleting said encryption key pair upon receiving a delete request from the non-member so that the non-member can expressly request the encrypted message be made unavailable for review.

9. The system of claim 1 including:

a member database contained within said computer readable medium having a member record associated with each of the members of the encryption system;

a unique public key contained within said member record associated with each of the members of said encryption system; and, a set of reply instructions contained with said computer readable medium in response to receiving a reply command from the non-member recipient through said recipient terminal for:

receiving a reply message from the non-member recipient intended for the sending member;

retrieving said unique public key associated with the sending member from said member database;

encrypting said reply message according to said unique public key of the sending member; and, informing said sending member that an encrypted reply message from the non-member is available for decrypting and review by the member so that a non-member can send an encrypted reply to a member of an encryption system without having to be a member of that encryption system.

10. The system of claim 1 including:

a member database contained within said computer readable medium having a member record associated with each of the members of the encryption system;

a unique private key contained within said member record associated with each of the members of the encryption system;

a set of member instructions contained within said computer readable medium in response to a first member sending an electronic message to a second member for:

retrieving a second member's public key from said member database, encrypting said electronic message responsive to said second member's public key; and, sending a notification to the second member notifying the second member that an encrypted message is available for decryption so that an electronic message is encrypted automatically and the receiving member is notified automatically when an encrypted message is available for decryption and review.

11. The system of claim 10 wherein said member instructions include instructions in response to the second member requesting to decrypt the encrypted message for:

retrieving a second member's private key from said member database;

decrypting the encrypted electronic message from the first member according to said second member's private key; and, providing said decrypted electronic message to the second member for review so that an electronic message can be encrypted, sent from a first member to a second member, and decrypt automatically.

12. A computerized system for encrypting an electronic message between a sender and a recipient regardless of whether the sender or recipient are members of an encryption system embodied in a computer readable medium comprising:

a means for receiving input from the sender including an encryption pass-phrase associated with an electronic message;

a means for generating an encryption key pair not held by the non-member recipient for encrypting the message;

a means for encrypting the electronic message responsive to said encryption key pair so that said key pair may be used to decrypt said encrypted message;

a means for encrypting said encryption key pair according to said encryption pass-phrase;

a means for notifying a recipient non-member that an encrypted message is available to the non-member for decryption and review;

a means for receiving a decryption pass-phrase from the non-member;

a means for decrypting said encrypted encryption key pair in response to receiving a decryption pass-phrase corresponding to said encryption pass-phrase associated with the electronic encrypted message;

a means for decrypting said encrypted message according to said decrypted encryption key pair; and, a means for providing the decrypted message to the recipient non-member so that the non-member can receive and decrypt an electronic message from a member of an encryption system even though the non-member is not a member of the encryption system.

13. The system of claim 12 including:

a means for receiving a message lifetime value from the sender;

means for associating said message lifetime value with the encrypted message sent by the sending member; and, a means for deleting said encrypted message upon expiration of said lifetime value associated with the electronic message so that upon expiration of said lifetime value the electronic message can not be decrypted and therefore is unavailable for review.

14. The system of claim 12 including a means for deleting said encryption key pair associated with said encrypted message upon the expiration of a predetermined period of time so that if the encrypted message is not decrypted within said predetermined period of time, the encrypted message is unavailable for review.

15. The system of claim 12 including a means for deleting said encryption key pair upon receiving a delete request from said non-member so that the non-member can expressly request for the encrypted message to be made unavailable for review.

16. The system of claim 12 including:

a means for receiving a reply message from the non-member intended for the sending member;

a means for encrypting said reply message; and a means for informing the sending member that an encrypted reply message from the non-member is available for decrypting and review by the member so that a non-member can send an encrypted reply to a member of an encryption system without having to be a member of that encryption system.

17. The system of claim 12 including:

a means for encrypting an electronic message sent between a first member and a second member of an electronic encryption system; and, a means for sending a notification to the second member notifying the second member that an encrypted message is available for decryption so that an electronic message is encrypted automatically and the receiving member is notified automatically when an encrypted message is available for decryption and review.

18. The system of claim 17 including a means for decrypting the encrypted electronic message from the first member according to a decryption request from the second member so that an electronic message can be encrypted, sent from a first member to a second member, and decrypted automatically.

19. The system of claim 12 including:

a means for receiving a message lifetime value from the sender;

a means for associating said lifetime value with the encrypted message sent by the sending member; and, a means for deleting said encryption key pair upon expiration of said lifetime value so that upon the expiration of said lifetime value, the electronic message can not be decrypted with said encryption keys.

20. The system of claim 12 including a means for deleting said encrypted message so that if said encrypted message is not decrypted within prescribed a period of time, the message is unavailable for review.

21. The method for encrypting an electronic message between a sender and a recipient regardless of whether the sender or recipient are members of the encryption system comprising the steps of:

receiving the electronic message supplied by the sender to be sent to the recipient;

receiving an encryption pass-phrase supplied by the sender;

generating an encryption key pair stored within the computer readable medium and not held by the non-member recipient;

encrypting the message according to said encryption key pair so that said key pair may be used to decrypt the encrypted message;

sending a notification to the recipient that an encrypted message is available to the recipient for review; and, encrypting said encryption key pair according to said encryption pass-phrase.

22. The method of claim 21 including the steps of:

receiving a decryption pass-phrase supplied by the recipient;

decrypting said encryption key pair in response to receiving a decryption pass-phrase corresponding to said encryption pass phrase;

decrypting said encrypted message according to said encryption key pair; and, providing the decrypted message for review to the recipient so that the non-member can retrieve and decrypt the electronic message from a sender of an encryption system even though the recipient is not a member of the encryption system.

23. The method of claim 21 including the steps of:

destroying said unencrypted encryption key pair after encrypting said key pair; and, destroying said encryption pass-phrase so that only said encrypted encryption key pair is remaining.

24. The method of claim 21 including the steps of:

prompting the sender for a message lifetime value;

associating said message lifetime value with the encrypted message; and, deleting said encrypted message upon said expiration of said lifetime value so that upon expiration of said lifetime value, the electronic message unavailable for review.

25. The method of claim 21 including the steps of deleting said encryption key pair associated with said encryption message upon the expiration of the predetermined period of time so that if the encrypted message is not decrypted within said predetermined period of time, the encrypted message is unavailable for review.

26. The method of claim 21 including deleting said encryption key pair upon receiving a delete request from the recipient so that the recipient can expressly request for an encrypted message to made unavailable for review.

27. The method of claim 21 including the steps of:

providing a unique public key associated with the sender;

receiving a reply message from the recipient intended for the sender;

encrypting said reply message according to said unique public key; and, informing the sender that the encrypted reply message from the recipient is available for review.

28. The method of claim 21 including:

supplying a unique public key associated with recipient;

encrypting the electronic message responsive to said recipient's public key; and, sending a notification to the recipient notifying the recipient that an encrypted message is available for decryption and review.

29. The method of claim 28 including:

supplying a unique private key associated with the recipient;

decrypting the encrypted electronic message from the sender according to said recipient's private key; and, providing said decrypted electronic message to the recipient for review.

30. A computerized system for encrypted an electronic message between a sender's terminal and a recipient's terminal for a recipient who is not a member of the encryption system comprising:

a computer readable medium;

a set of non-member computer readable instruction contained within said computer readable medium for receiving a message to be send to a non-member recipient from said sender's terminal, receiving a pass-phrase for encrypting a generating encryption key pair stored within the computer readable medium, encrypting the electronic message responsive to said encryption key pair so that said key pair may be used to decrypt said encrypted message, encrypting said encryption key pair according to said pass-phrase, sending a notification to said recipient terminal that an encrypted message is available to the known non-member recipient, receiving a decryption pass-phrase from said non-member recipient, decrypting said encrypted key pair in response to receiving a decryption pass-phrase, decrypting said encrypted message according to said encryption key pair, and providing the decrypted message for review to said known non-member recipient so that the recipient can receive and decrypt electronic messages even though the known non-member is not a member of the encryption system.

31. The system of claim 30 wherein said set of non-member instructions include instructions for prompting the sender for an encryption pass-phrase at said sender terminal.

32. The system of claim 30 wherein said set of non-member instructions include instructions for automatically generating an encryption pass-phrase.

33. The system of claim 30 wherein said set of non-member instructions include instructions for removing said encryption pass-phrase from said computer readable medium after said encryption key pair has bee encrypted so that only said encrypted encryption key pair is contained within said computer readable medium.

* * * * *